US008863698B2

(12) United States Patent
Romiluyi

(10) Patent No.: US 8,863,698 B2
(45) Date of Patent: Oct. 21, 2014

(54) TWO DOG LEASH

(76) Inventor: Nicole Romiluyi, Suwanee, GA (US)

(*) Notice: Subject to any disclaimer, the term of this patent is extended or adjusted under 35 U.S.C. 154(b) by 299 days.

(21) Appl. No.: 13/222,284

(22) Filed: Aug. 31, 2011

(65) Prior Publication Data
US 2013/0047936 A1 Feb. 28, 2013

(51) Int. Cl.
*A01K 27/00* (2006.01)
(52) U.S. Cl.
CPC .................... *A01K 27/003* (2013.01)
USPC ........................................................ 119/796
(58) Field of Classification Search
CPC .... A01K 27/00; A01K 27/003; A01K 27/004
USPC .................. 119/769, 772, 795, 796, 797, 798
See application file for complete search history.

(56) References Cited

U.S. PATENT DOCUMENTS

| 4,404,927 | A | * | 9/1983 | Woutat | 119/776 |
| 5,632,234 | A | * | 5/1997 | Parker | 119/795 |
| 6,237,539 | B1 | * | 5/2001 | Sporn | 119/795 |
| 6,337,444 | B1 | * | 1/2002 | Liao | 174/135 |
| 6,474,270 | B1 | * | 11/2002 | Imes | 119/796 |
| 6,539,897 | B1 | * | 4/2003 | Dossenback | 119/795 |
| 7,559,292 | B2 | * | 7/2009 | Blandford | 119/796 |
| D637,364 | S | * | 5/2011 | Blakemore | D30/153 |
| 8,209,825 | B2 | * | 7/2012 | Carter | 24/634 |

* cited by examiner

*Primary Examiner* — Rob Swiatek
*Assistant Examiner* — Ebony Evans
(74) *Attorney, Agent, or Firm* — The Law Office of Jerry D. Haynes

(57) ABSTRACT

The present invention is a two dog leash that includes a handle with an aperture, a casing and a retractable device disposed in the casing, a first nylon line portion that is released and retracted by the retractable device and a clasp that is attached to the distal end of the first line portion. The leash also includes a triangular-shaped retractable mechanism and is adjacently disposed below the clasp, a second nylon line portion with the proximal end being integral to the retractable mechanism and a third nylon line portion with the proximal end being integral to the retractable mechanism.

16 Claims, 1 Drawing Sheet

TWO DOG LEASH

TECHNICAL FIELD & BACKGROUND

Individuals often own more than one dog. When walked, often both dogs will attempt traverse in separate directions, adding strain on the person handling the two dogs.

The present invention generally relates to a dog leash. More specifically, the invention is a two dog leash.

It is an object of the invention to provide a two dog leash that allows a user to walk two dogs at the same time on one leash.

It is an object of the invention to provide a two dog leash that allows a user to control two dogs at the same time on one leash.

It is an object of the invention to provide a two dog leash that allows for more flexibility when handling two dogs on the two dog leash.

What is really needed is a two dog leash that allows a user to walk two dogs at the same time on one leash that allows a user to control two dogs at the same time on one leash that allows for more flexibility when handling two dogs on the two dog leash.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
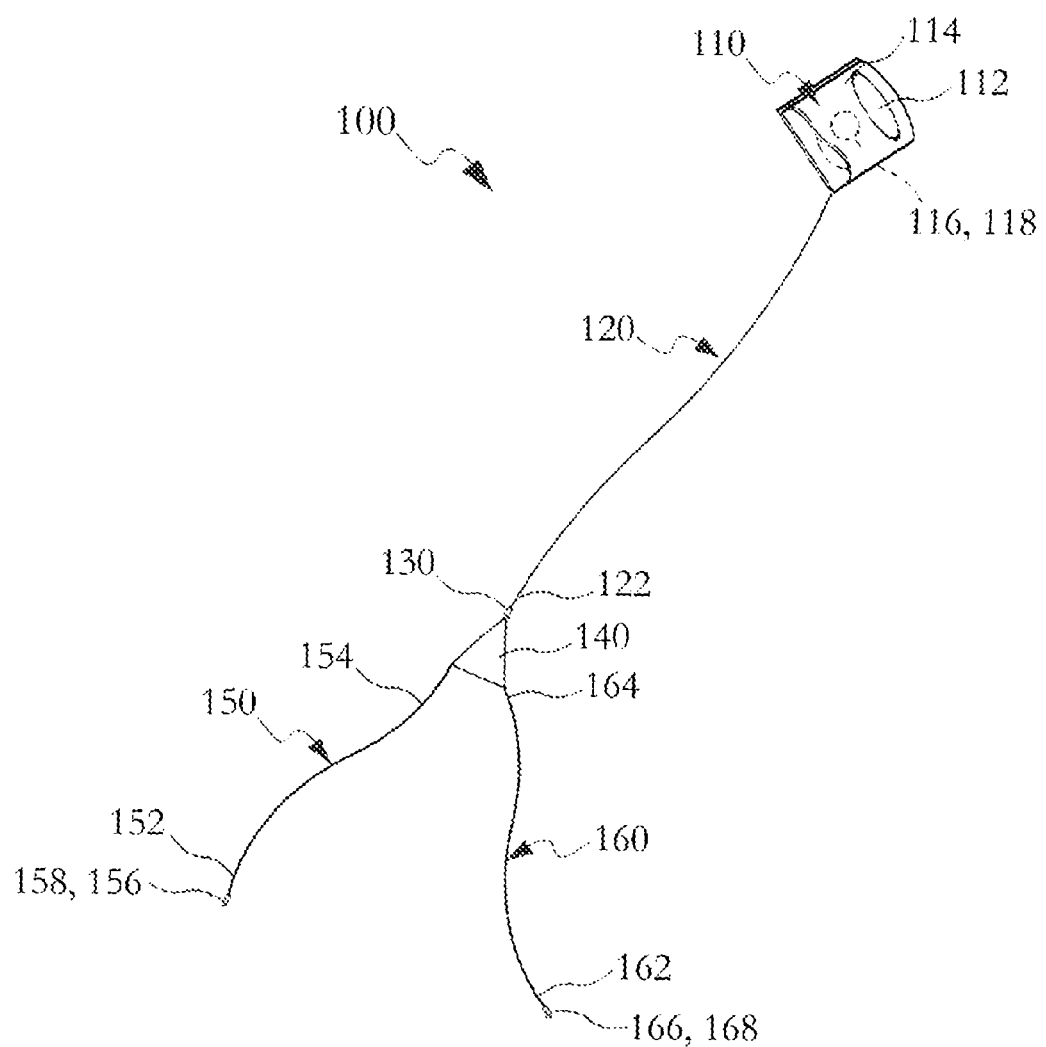
FIG. 1 illustrates an overhead side perspective view of a two dog leash, in accordance with one embodiment of the present invention.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates an overhead side perspective view of a two dog leash 100, in accordance with one embodiment of the present invention. The two dog leash 100 allows a user to walk two dogs at the same time on one leash that allows a user to control two dogs at the same time on one leash that allows for more flexibility when handling two dogs on the two dog leash.

The two dog leash 100 includes a handle 110, a first line portion 120, a clasp 130, a retractable mechanism 140, a second line portion 150 and a third line portion 160. The handle 110 includes an aperture 112, a casing 114 and a retractable device 116 such as a spool 118 or other suitable retractable device. The first line portion 120 includes a distal end 122 and is wrapped around and released and retracted as desired by the spool 118. The first line portion 120 is made of nylon or other suitable material. The clasp 130 is attached to the distal end 122 of the first line portion 120. The retractable mechanism 140 is triangular-shaped and is adjacently disposed below the clasp 130 and retracts any line portions integral to the retractable mechanism 140. The second line portion 150 has a distal end 152 and a proximal end 154 with the proximal end 154 being integral to the retractable mechanism 140. The second line portion 150 is retracted and released as desired by a user with the retractable mechanism 140. The second line portion 150 also has a collar clasp 156 disposed on the distal end 152 of the second line portion 150. The second line portion 150 is made of nylon or any other suitable material. The third line portion 160 has a distal end 162 and a proximal end 164 with the proximal end 164 being integral to the retractable mechanism 140. The third line portion 160 is also retracted and released as desired by a user with the retractable mechanism 140. The third line portion 160 also has a collar clasp 166 disposed on the distal end 162 of the third line portion 150. The third line portion 160 is also made of nylon or any other suitable material. The collar clasps 156,166 can be any suitable collar clasps and are typically a releasable hook 158,168.

Comprised of a retractable nylon leash with a single handle which serves to control both leashed dogs, the two dog leash is an attractive alternative to currently available fixed-length leash attachments. The two dog leash incorporates a retractable triangle-shaped retractable mechanism which attaches to the end of a standard retractable dog leash. The two dog leash allows for two retractable extensions to be attached utilizing the afforded clasps on the distal ends of the retractable extensions, allowing both dogs to move freely up to 4 feet. Able to create a more enjoyable walking experience for both the dogs and the user, the two dog leash will be readily available at a variety of retail pet stores. The two dog leash features a triangle shaped mechanism which allows two leash extensions to be simultaneously attached via the afforded clasps. The two dog leash is designed to be durable, lightweight, flexible, effective and safe.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A two dog leash, comprising:
 a handle with an aperture, a casing with an interior and retracted by a retractable device deposed in said casing;
 a first line portion with a distal end that is released and retracted by said retractable device;
 a clasp that is attached to said distal end of said first line portion;
 a retractable mechanism that is triangular-shaped and is adjacently integral below said clasp;
 a second line portion with a distal end and a proximal end with said proximal end of second line portion being integral to said retractable mechanism; and a third line portion with a distal end and a proximal end with said proximal end of the third line portion being integral to said retractable mechanism.

2. The leash according to claim 1, wherein said first line portion is made of nylon.

3. The leash according to claim 1, wherein said second line portion is refracted and released with said retractable mechanism.

4. The leash according to claim 1, wherein said second line portion has a first collar clasp disposed on said distal end of said second line portion.

5. The leash according to claim 1, wherein said third line portion is refracted and released with said retractable mechanism.

6. The leash according to claim 1, wherein said third line portion has a second collar clasp disposed on said distal end of said third line portion.

7. A two dog leash, comprising:
   a handle with an aperture, a casing with an interior and a retractable device disposed in said casing;
   a first nylon line portion with a distal end that is released and retracted by said retractable device;
   a clasp that is attached to said distal end of said first line portion;
   a triangular-shaped retractable mechanism and is adjacently integral below said clasp;
   a second line portion with a distal end and a proximal end with said proximal end of second line portion being integral to said retractable mechanism; and
   a third line portion with a distal end and a proximal end with said proximal end of the third line portion being integral to said retractable mechanism.

8. The leash according to claim 7, wherein said retractable device is a retractable spool.

9. The leash according to claim 7, wherein said second line portion is refracted and released with said retractable mechanism.

10. The leash according to claim 7, wherein said second line portion has a first collar clasp disposed on said distal end of said second line portion.

11. The leash according to claim 10, wherein said first collar clasp is a releasable hook.

12. The leash according to claim 7, wherein said third line portion is refracted and released with said retractable mechanism.

13. The leash according to claim 7, wherein said third line portion has a second collar clasp disposed on said distal end of said third line portion.

14. A two dog leash, comprising:
   a handle with an aperture, a casing with an interior and a retractable device disposed in said casing:
   a first nylon line portion with a distal end that is released and retracted by said retractable device;
   a clasp that is attached to said distal end of said first line portion;
   a triangular-shaped retractable mechanism and is adjacently integral below said clasp;
   a second nylon line portion with a distal end and a proximal end with said proximal end of the second nylon line portion being integral to said retractable mechanism, wherein said second line portion is retracted and released with said retractable mechanism; and
   a third nylon line portion with a distal end and a proximal end with said proximal end of the third nylon line being integral to said retractable mechanism.

15. The leash according to claim 14, wherein said third line portion is refracted and released with said retractable mechanism.

16. The leash according to claim 14, wherein said third line portion has a reasonable hook disposed on said distal end of said third line portion.

* * * * *